United States Patent [19]

Sekino et al.

[11] Patent Number: 4,646,221
[45] Date of Patent: Feb. 24, 1987

[54] CONTROL CIRCUIT FOR INVERTER

[75] Inventors: Yoshihiro Sekino, Tokyo; Masayuki Aoki; Nobuhiro Hotaka, both of Nagano, all of Japan

[73] Assignee: Shinano Electric Co., Ltd., Tokyo, Japan

[21] Appl. No.: 739,235

[22] Filed: May 30, 1985

[30] Foreign Application Priority Data

May 31, 1984 [JP] Japan ................................ 59-112724

[51] Int. Cl.$^4$ ............................................. H02M 1/12
[52] U.S. Cl. .......................................... 363/41; 363/98
[58] Field of Search .................. 363/41, 42, 80, 98, 363/132, 136; 323/271, 283; 307/265

[56] References Cited

U.S. PATENT DOCUMENTS

| | | | |
|---|---|---|---|
| 3,402,342 | 9/1968 | Wagner | 323/271 |
| 3,781,634 | 12/1973 | Jessee | 363/41 |
| 3,818,306 | 6/1974 | Marini | 323/283 X |
| 4,041,367 | 8/1977 | Gold et al. | 363/80 X |
| 4,215,392 | 7/1980 | Rhoads | 363/41 X |
| 4,382,275 | 5/1983 | Glennon | 363/41 |
| 4,504,899 | 3/1985 | Jessee | 363/41 X |

Primary Examiner—Patrick R. Salce
Assistant Examiner—Marc S. Hoff
Attorney, Agent, or Firm—Cushman, Darby & Cushman

[57] ABSTRACT

A controlled circuit for generating signals for switching the switch elements of a DC to AC inverter. The circuit monitors the output waveform of the inverter and controls the firing of the switch elements in the inverter from DC to AC inverter circuit to restore it to a sinusoidal waveform in the event that it is distorted by non linear loads and to recover the voltage level within the allowable band in the event that it is disturbed by step load changes.

2 Claims, 6 Drawing Figures

CONTROL CIRCUIT FOR INVERTER

BACKGROUND OF THE INVENTION

1. Field of the Invention

This invention relates to inverter equipment which converts a direct current (D.C.) into a sine wave alternating current (A.C.). More particularly, this invention is applicable to a control circuit for an inverter which controls the on-off switching of semi-conductor switch elements with pulse width modulated signals.

2. Prior Art

FIG. 5 (prior art) is a block diagram to show the structure of a main circuit of a known inverter. A converter circuit 2 includes semiconductor switch elements $3_1$ to $3_4$ which are opened or closed in response to control signals for converting a DC current from a power source 1 to a filter 4. In this converter circuit 2, during a period when switch elements $3_1$ and $3_4$ are open and the switch elements $3_2$ and $3_3$ are closed, a voltage of level E is fed from power source 1 to a load 5 through the filter 4. During the period when the switch elements $3_1$ and $3_4$ are closed and the switch elements $3_2$ and $3_3$ are open, a voltage of negative polarity of level E is fed to filter 4. An AC voltage in the form of pulses is obtained at the output of converter circuit 2 by opening/closing alternately the pair of switch elements $3_1$ and $3_4$ and another pair of switch elements $3_2$ and $3_3$. The AC voltage is filtered into a sinusoidal form by filter 4 and fed to a load 5. The output from filter 4 is branched out to be inputted at a control circuit 6 (shown in FIG. 6 (Prior Art)) and the output therefrom is used as the above mentioned control signal.

The AC output voltage thus obtained from converter circuit 2 includes a large amount of harmonic components in addition to the fundamental frequency sine wave AC component. If these harmonic components include harmonic components of relatively lower order such as the third or the fifth harmonics, it is difficult for filter 4 to properly filter. It must have a large capacity. However, by using a large capacity filter, the transient response characteristic of the converter equipment is adversely affected. In order to alleviate such defects, there has been proposed a method which provides various patterns in the on-off operation of the switch elements $3_1$ to $3_4$ to reduce lower order harmonic content from converter circuit 2.

FIG. 6 (Prior Art) shows a block diagram of a control circuit 6 of a prior art inverter equipment.

In this prior art circuit, the sine wave AC voltage V of the inverter is rectified by a rectifier 11, then converted to a DC voltage having less ripple via a smoother 12 and compared with the reference voltage of a DC reference voltage source 10. Smoother 12 acts as a low-pass filter. If a harmonic component is generated due to the influence of load 5 in the waveforms of the sine wave AC voltage outputted from the inverter, smoother 12 attenuates such a component and any information of the AC output voltage distortion does not transfer to the control circuit. This method is therefore defective in that the distortion of the inverter output voltage waveform which might be caused by an external non-linear load (such as load 5) cannot be compensated. The dynamic level fluctuation of inverter output voltage which might be caused due to sudden changes of load 5 is attenuated by smoother 12 in this method. It takes several cycles for the inverter output voltage to be corrected and restored to a normal level and the transient variation amplitude of the output voltage becomes inconveniently large.

SUMMARY OF THE INVENTION

An object of this invention is to obviate the above mentioned problems and to provide an improved control circuit for inverter equipment. In particular the improved control circuit properly responds when the AC output voltage of the inverter changes due to a step change in load. It detects such a change rapidly and immediately compensates by suppressing the transient variation within the allowable band. This provides an output sine wave AC voltage of higher quality and precision after the voltage transient is settled.

This invention provides an inverter equipment including: a DC power source; a converter circuit including plural semiconductor switch elements which are controlled by pulse-width modulated control signals to convert DC output from a DC power source to a pulse width modulated AC output; a filter which extracts the component of the fundamental frequency out of the pulse width modulated alternate output from the converter circuit as an AC output voltage of the equipment; and a control circuit which generates the control signals based on the signal obtained by pulse-width modulating the carrier signal with the modulating signals based on the feedback signal from the AC output voltage.

The control circuit provided by this invention solves the aforementioned problems by including a DC reference voltage source, a converter means for rectifying the AC output voltage into DC signals, a first operative means for generating signals based on a difference voltage between the DC signal voltage and the DC reference voltage, a modulating means for generating a sine wave which has been amplitude-modulated with the signals based on said difference voltage a second operative means which generates signals based on the difference between the amplitude-modulated sine wave and the AC output voltage, and a feedback circuit which uses output difference signals from the second operative means as the modulating signals.

According to this invention, the fluctuation in the AC output voltage is regulated when the first feedback circuit comprising the AC output voltage, the converter means, the first operative means and the modulating means functions and the transient voltage variation in the AC output voltage is compensated by the second feedback circuit comprising the AC output voltage and the second operative means functions. The first feedback circuit which is slow in response speed but high in gain and the second feedback circuit which is low in gain but high in response speed are made to function respectively according to the condition of the variation of the alternate output voltage of the inverter equipment.

Since, according to this invention, the voltage waveforms of the inverter output can be maintained as a high quality sine wave even if the output current is distorted by a non-linear load such as, for example, a rectifier load, the inverter equipment can satisfactorily supply power to another load connected in parallel with the non-linear load without difficulty.

Another advantage of this inverter is that, as the AC output voltage waveform is maintained as a sine wave, there is no need to use a large-capacity and expensive filter, thereby lowering cost of the inverter equipment.

The invention inverter equipment can suppress not only the AC output voltage fluctuation but also the transient variation, thereby enabling the inverter equipment to supply power over a wide range of load conditions.

BRIEF DESCRIPTION OF THE DRAWINGS

The invention will be described in greater detail with reference to the accompanying drawings wherein like or corresponding parts have the same reference numeral, and wherein.

DETAILED DESCRIPTION OF THE PREFERRED EMBODIMENTS

Figure 1:
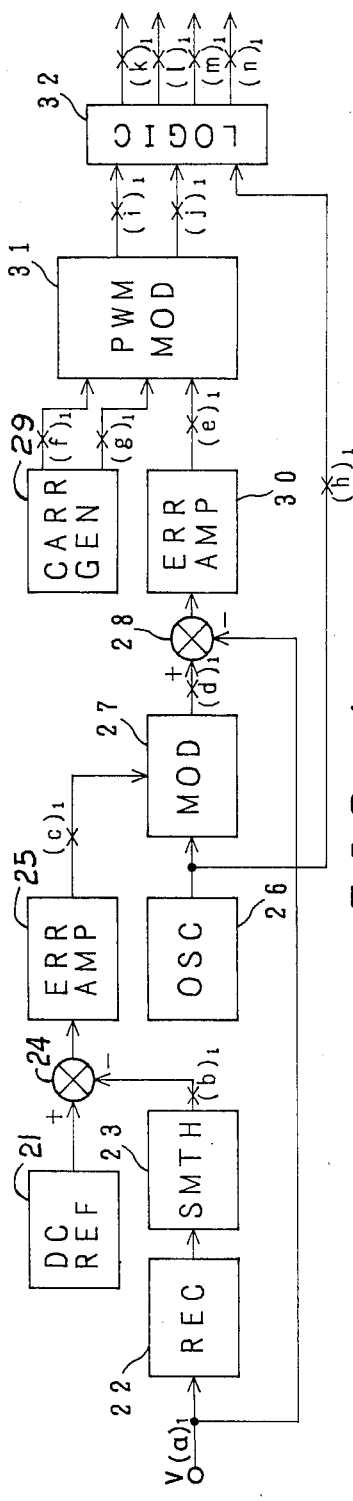
FIG. 1 is a block diagram of a first embodiment of the invention.
Figure 2:
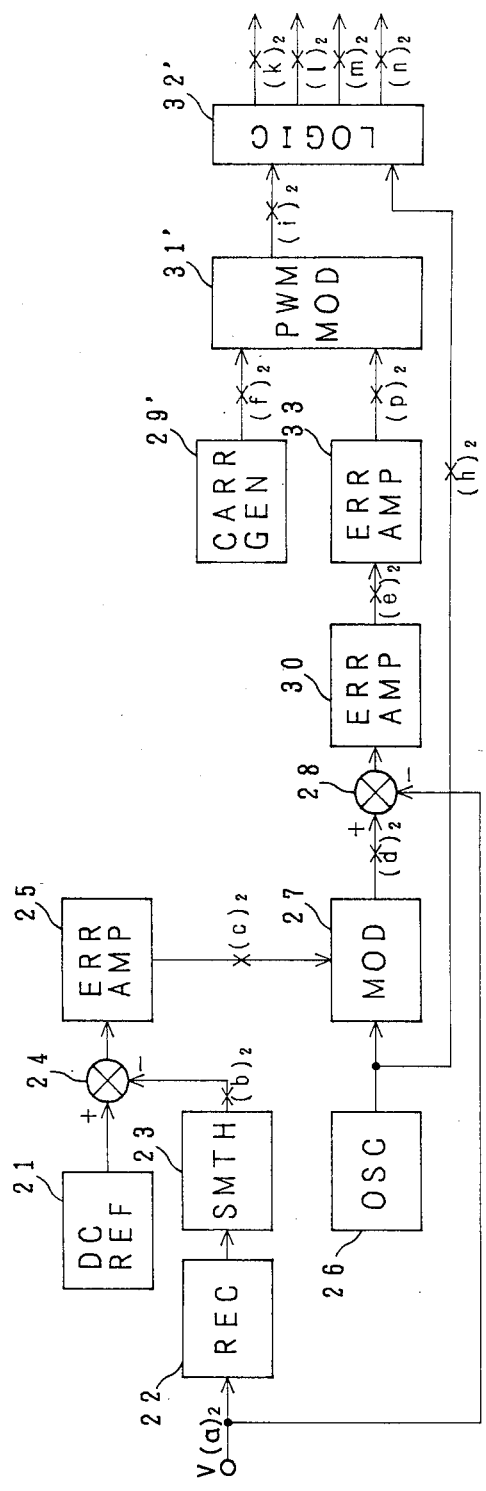
FIG. 2 is a block diagram of the second embodiment of the invention.
Figure 3:
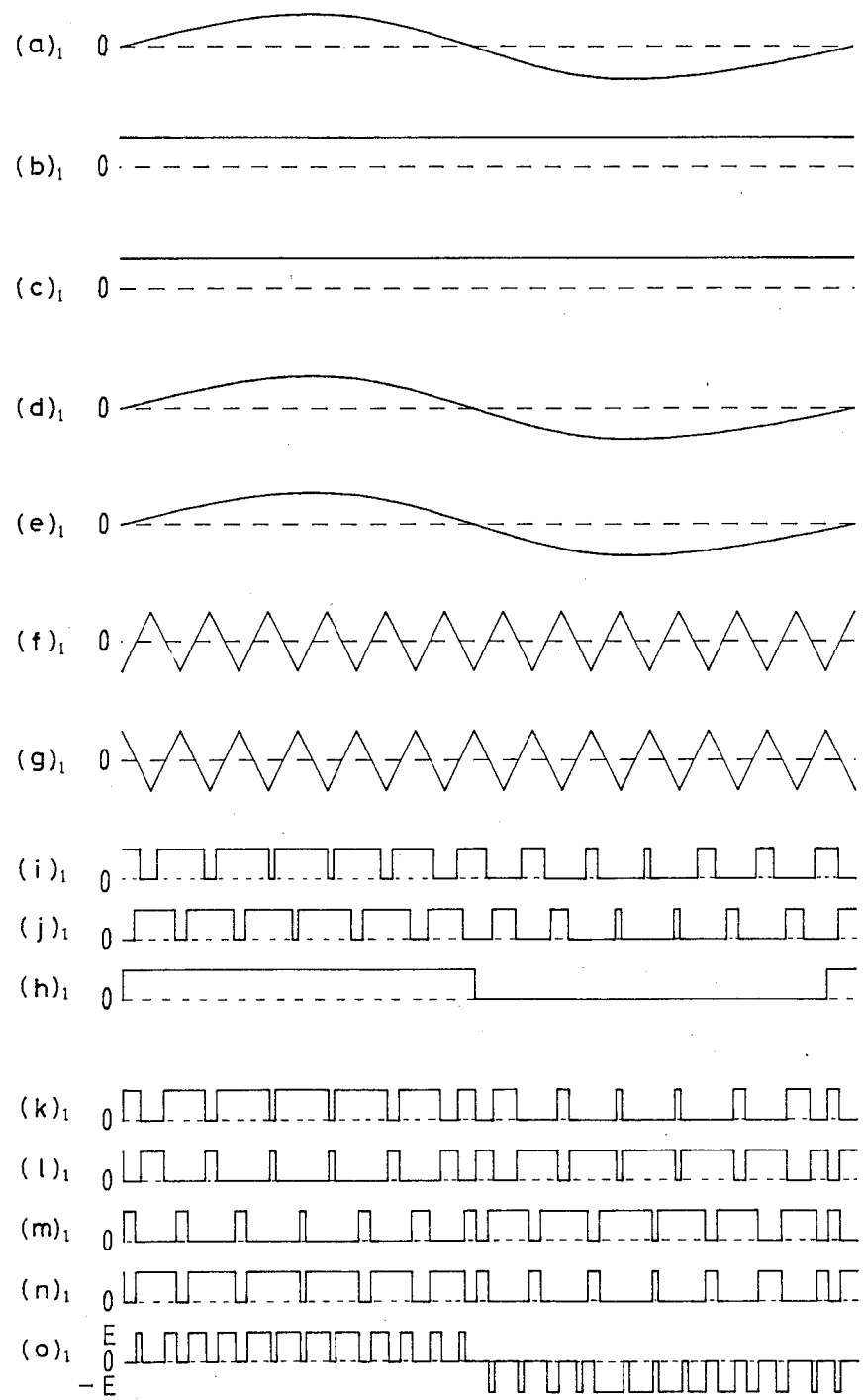
FIG. 3 is a waveform chart to show signal waveforms at respective points of the first embodiment of the invention.
Figure 4:
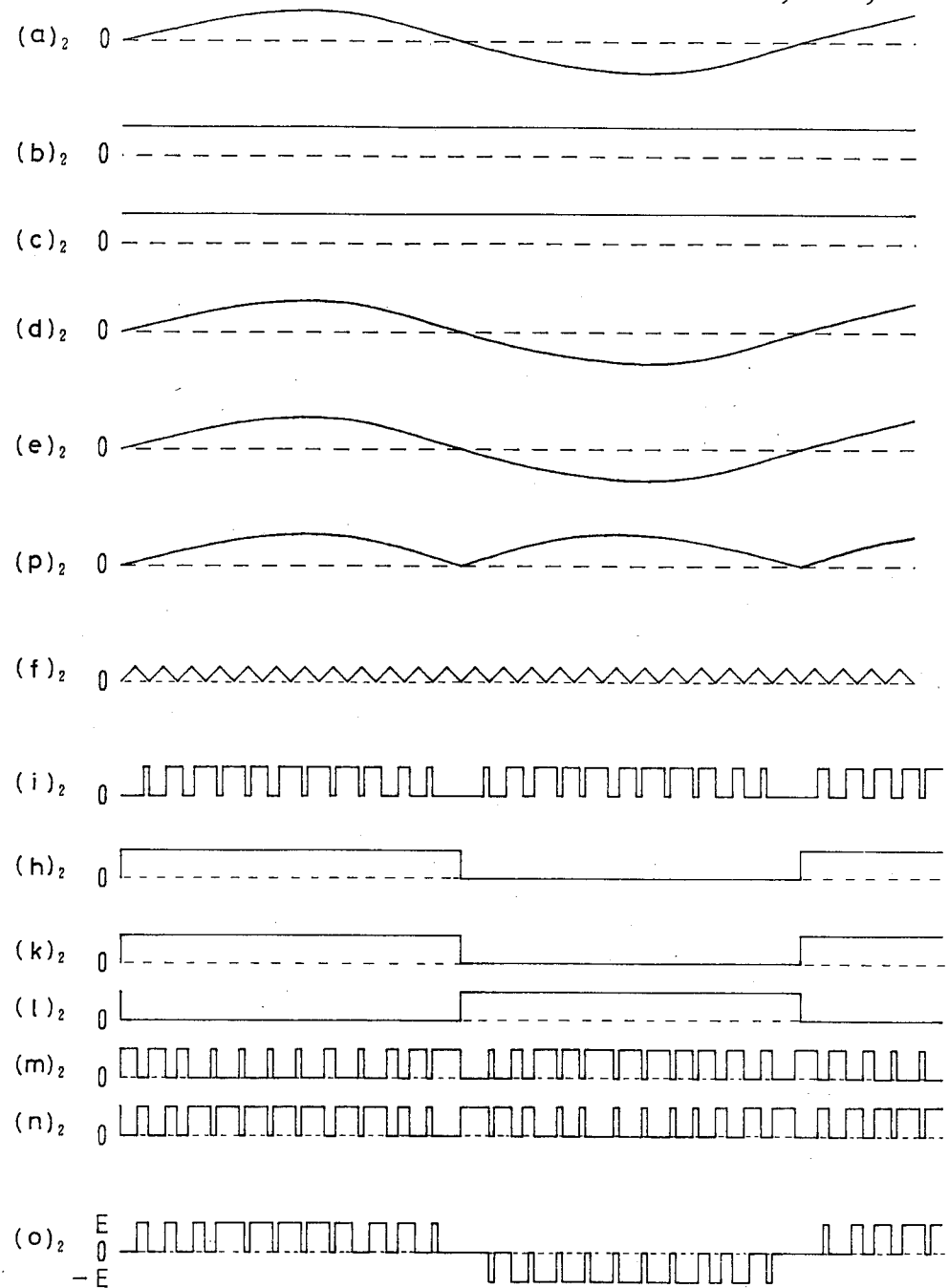
FIG. 4 is a waveform chart to show the signal waveforms at respective parts of the second embodiment of the invention.
Figure 6:
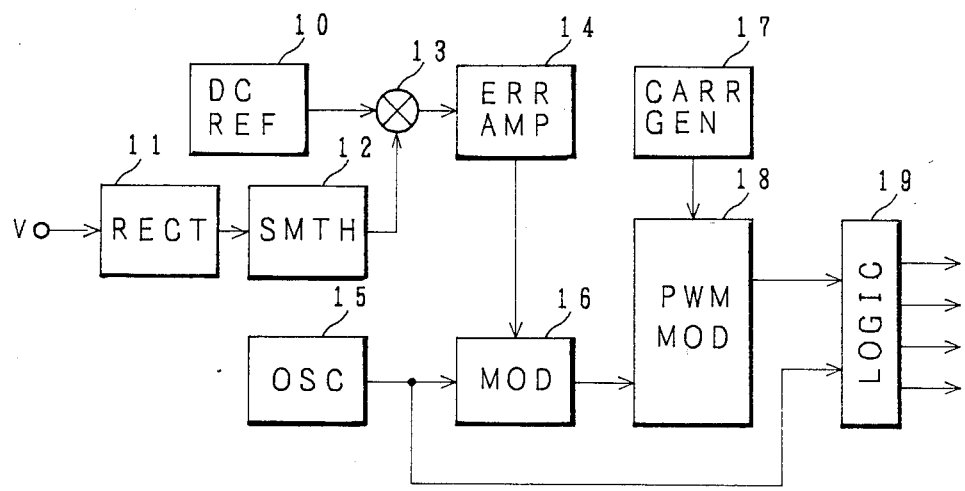
FIG. 6 (Prior Art) is a block diagram to show the structure of a prior art control circuit.

Referring to FIG. 1, there is shown a block diagram of a first embodiment of the invention. FIG. 2 is a block diagram of a second embodiment of the invention. FIGS. 1 and 2 are alternative block diagram embodiments of control circuit which is shown in Prior Art configuration in FIG. 6. (The invention provides new configurations for control circuit 6 which provides a substantial improvement on the prior art control circuit shown in FIG. 6). FIG. 3 is a waveform chart of signals at respective sections of the first embodiment circuit wherein the letters $(a)_1-(n)_1$ denote respectively the waveforms of signals at the locations denoted by the letters $(a)_1-(n)_1$ of FIG. 1. FIG. 4 is a waveform chart of signals at sections of the second embodiment circuit whereinthe letters $(a)_2-(n)_2$ denote respectively the waveforms of the signals at locations denoted by the letters $(a)_2-(n)_2$ of FIG. 2.

The first embodiment circuit will now be described referring to FIG. 1. The first embodiment circuit includes a DC reference voltage source 21, a rectifier 22, a smoother 23, a first subtractor 24, an error signal amplifier 25, a sine wave oscillator 26, an amplitude modulator 27, a second subtractor 28, a carrier wave generator 29, an error signal amplifier 30, a pulse width modulator 31 and a logical operation circuit 32. The voltage output V of an inverter (not shown) is connected to an input of rectifier 22. An output of rectifier 22 is connected to an input of smoother 23. DC reference voltage source 21 is connected to the "plus" input of first subtractor 24 and the output of smoother 23 is connected to the "minus" input of the first subtractor 24. The output of subtractor 24 is connected to the input of error signal amplifier 25. The output of the sine wave oscillator 26 is connected to a first input of an amplitude modulator 27. The output of the error amplifier 25 is connected to a second input of amplitude modulator 27. The output of amplitude modulator 27 is connected to the "plus" input of second subtractor 28. Voltage output V of the inverter (not shown) is connected to the "minus" input of second subtractor 28. The output of second subtractor 28 is connected to the input of an error signal amplifier 30. The first output of carrier generator 29 is connected to the first input of a pulse width modulator 31, the second output of the generator 29 is connected to the second input thereof, and the output of the error signal amplifier 30 is connected to the third input of the pulse width modulator 31. The first output of the pulse width modulator 31 is connected to the first input of a logical operation circuit 32. The second output of the pulse-width modulator 31 is connected to the second input of the logical operation circuit 32. The output of the sine wave oscillator 26 is connected to the third input of the logical operation circuit 32. The first through the fourth outputs of the logical operation circuit 32 are connected to a driving input of an inverter converter circuit (not shown) for operating its switching elements.

Operation of the first embodiment circuit will now be described.

Figure 5:
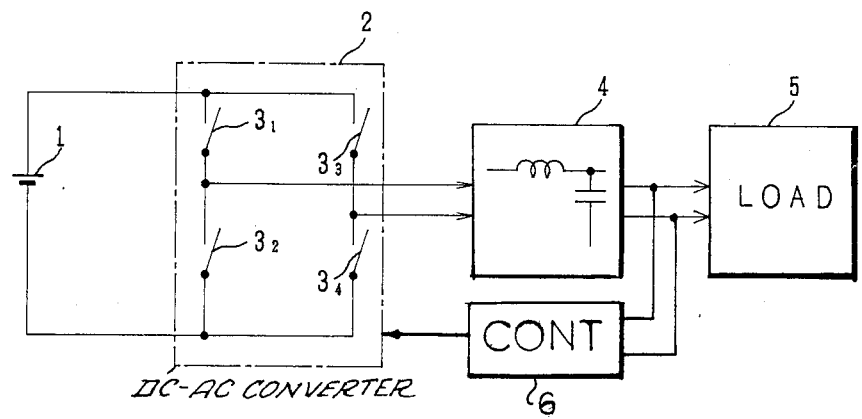
FIG. 5 (Prior Art) is a block diagram of a main circuit of the inverter to which the inventions are applicable.

The output voltage V of the inverter is converted to DC voltage with less ripples by rectifier 22 and smoother 23 and directed to the "minus" input of subtractor 24. DC reference voltage source 21 is directed to the "plus" input of subtractor 24. Subtractor 24 calculates the difference between its two input voltages and the difference thereof is directed to error signal amplifier 25. The difference voltage is amplified by the error signal amplifier 25 and coupled to amplitude modulator 27. Amplitude modulator 27 changes the amplitude of the output of the sine wave oscillator 26 based on the output of the error signal amplifier 25 and the output thereof is fed to the "plus" input of subtractor 28. The output voltage V of the inverter is directed to the minus input of the subtractor 28, which calculates the difference between its two voltages and the difference voltage is directed to error signal amplifier 30. The difference voltage inputted to error signal amplifier 30 is amplified there and the output having an approximately sinusoidal waveform is fed to the pulse-width modulator 31. A carrier signal of triangular waveform provided by carrier generator 29 is directed to pulse width modulator 31. Pulse width modulator 31 modulates in pulse-width the carrier from carrier generator 29 with the modulating signals from error signal amplifier 30. The signals which have been modulated in pulse-width and outputted from the circuit are coupled to logical operation circuit 32. At the logical operation circuit 32, on-off pattern signal is formed out of the pulse-width modulated signals and the signals synchronized to the sine wave of the output of the sine wave generator 26 as the control signals for switch elements $3_1$ through $3_4$ of the converter circuit 2 and fed to switch elements $3_1$ through $3_4$ respectively (FIG. 5).

The operation of the first embodiment circuit of this invention is further described referring to FIG. 3.

The sine wave AC voltage $(a)_1$ is rectified by rectifier 22, and converted to DC signal $(b)_1$ by smoother 23 to have almost no ripples. The outputs of the DC reference voltage source 21 and smoother $23(b)_1$ are respectively directed to subtractor 24 which calculates the difference therebetween. The difference signal is amplified by the error signal amplifier 25 to become an amplitude by the error signal amplifier 25 to become an amplitude modulated signal $(c)_1$. The output from sine wave generator 26 is directed to amplitude modulator 27 and the amplitude is changed depending on the level of the signal $(c)_1$ to become a modulated sine wave $(d)_1$. The sine wave AC voltage $(a)_1$ and the modulated sine wave (d)₁ are respectively directed to the subtractor 28 to obtain the difference signal therebetween. The signal is amplified by error signal amplifier 30 to become the output (e)₁ having the form substantially similar to the sine wave form. Output (e)₁ is inputted to the pulse-width modulator 31 as a modulating signal. As the pulse width modulator 31 has received the carrier (f)₁ of triangular waveform from the carrier generator 29 and the wave (g)₁ of the phase opposite to the carrier (f)₁, the carrier waves (f)₁ and (g)₁ are pulse-width modulated with a modulating signal (e)₁ by modulator 31. More specifically, the pulse trains (i)₁ and (j)₁ are outputted as the reference on-off signal from the modulator 31 to the logical operation circuit 32 at a high level during the time when the level of the modulating signal (e)₁ is higher than that of the carriers (f)₁ and (g)₁, and at a low level during the period when the level of the modulating signal is lower than that of the carriers.

Logical operation circuit 32 forms the signals (k)₁, (l)₁, (m)₁ and (n)₁ out of these reference on-off signals (i)₁ and (j)₁ and a square wave (h)₁ which corresponds to the sine wave or the output of the sine wave generator 26 to control the on-off of the switch elements 3₁–3₄ (FIG. 5) according to the logical expression below.

$$(k)_1 = (h)_1 \cdot (i)_1 + \overline{(h)}_1 \cdot (j)_1$$

$$(l)_1 = \overline{(k)}_1$$

$$(m)_1 = (h)_1 \cdot \overline{(j)}_1 30 \, \overline{(h)}_1 \cdot \overline{(i)}_1$$

$$(n)_1 = \overline{(m)}_1$$

The signals (k)₁–(n)₁ are coupled respectively to switch elements 3₁–3₄ to drive a converter circuit 2 such as shown in FIG. 5 (Prior Art), thereby forming the pulse-width modulated AC output voltage (o)₁ having three levels of voltages, E, O, and −E.

As described in the foregoing, this embodiment is characterized in that the output voltage (a)₁ of the inverter is compared with the sine wave (d)₁ which is amplitude-modulated by an error signal from the reference DC voltage and the DC voltage obtained by rectifying and smoothing the output voltage (a)₁ of the inverter. Therefore, when the output voltage of the inverter is changed by disturbance and the voltage waveform is distorted to deviate from the sine wave, the difference from the sine wave voltage (d)₁ appears at the output (e)₁ of the error signal amplifier 30 and the difference is immediately corrected to reform the output wave form of the inverter to the sine wave form.

Even if the high frequency component is included in the output voltage V, it is sufficiently attenuated by the smoother 23 due to the feedback loop comprising output voltage V, rectifier 22, smoother 23, subtractor 24, and error amplifier 25, the system can stably operate even if the gain at the error signal amplifier 25 is large, thereby enabling to limit the scope of permissible voltage variation after voltage is settled. Smoother 23 includes a filter having a long time constant. Therefore it does not respond to sudden output voltage changes when the input and load conditions change.

The second embodiment will now be described referring to FIG. 2. In addition to the circuits of the first embodiment, the second embodiment futher comprises a rectifier (error amplifier) 33. The second embodiment is different from the first embodiment in the structures of the carrier generator 29', the pulse-width modulator 31', and logic circuit 32'. The output of carrier generator 30 is connected to the input of rectifier 33. The output of the carrier generator 29' is connected to a first input of pulse width modulator 31'. The output of rectifier 33 is connected to the second input of the pulse width modulator 31'. The output of the pulse-width modulator 31' is connected to the logical operation circuit 32'. The above connections differ from those of the carrier generator 29, the error signal amplifier 30, the pulse width modulator 31 and the logic circuit 32 of the first embodiment.

The operation of the second embodiment will be explained referring to FIG. 4. In the first embodiment, semi-conductor switch elements 3₁–3₄ of FIG. 5 are driven with signals which are respectively modulated in pulse-width and the alternate output voltage of the converter 2 of FIG. 5 becomes the pulse train of the frequency twice as much as the switching frequency of the semiconductor switch elements 3₁–3₄. But in the second embodiment, the semiconductor switch elements 3₁ and 3₂ are driven with the frequency of the reference wave, and the elements 3₃ and 3₄ are driven with the signals modulated in pulse-width, and the output voltage of the modulator 2 becomes the pulse train of the frequency of the reference wave, and the elements 3₃ and 3₄ are driven with the signals modulated in pulse-width, and the output voltage of the modulator 2 becomes the pulse train of the frequency identical to the switching frequency of the semiconductor switch elements 3₃ and 3₄.

The inverter output voltage (a)₂ is rectified by rectifier 22, and smoothed by the smoother 23 to become DC signal (b)₂. Subtractor 24 calculates the difference between the output of DC reference voltage source 21 and the DC signal (b)₂. The difference is amplified by error signal amplifier 25 to generate the signal (c)₂. The output of sine wave generator 26 is amplitude-modulated with the value of the signal (c)₂ by amplitude modulator 27 to generate the signal (d)₂, which is then directed to the subtractor 28. Substractor 28 calculates the difference between the inverter output voltage(a)₂ and the signal (d)₂ and the difference is amplified by the error amplifier 30 to generate the signal (e)₂. Signal (e)₂ is full-wave rectified to become a modulating signal (p)₂ and fed to the pulse width modulator 31'. Pulse width modulator 31' modulates the carrier (f)₂ from the carrier generator 29' with this modulating signal (p)₂. In other words, pulse width modulator 31' outputs the pulse train output (i)₂ as the reference on-off signal to the logical operation circuit 32' at a high level during the time when the level of the modulating signal (p)₂ is higher than that of the carrier (f)₂ and at a low level during the time when the level of the signal (p)₂ is lower than that of the carrier (f)₂. Logical operation circuit 32' forms signals (k)₂, (l)₂ and (m)₂ out of the reference on-off signal (i)₂ and a square wave (h)₂ corresponding to the sine wave or the output of the sine wave oscillator 26 to control switching of the switches 3₁ through 3₄ in accordance with the logical expression below.

$$(k)_2 = (h)_2$$

$$(l)_2 = \overline{(k)}_2$$

$$(m)_2 = (h)_2 \cdot \overline{(i)}_2 + \overline{(h)}_2 \cdot (i)_2$$

$$(n)_2 = \overline{(m)}_2$$

The signals $(k)_2$ through $(n)_2$ are sent out respectively to the switches $3_1$ through $3_4$. The signals drive the inverter converter circuit 2 shown in FIG. 5 to generate the pulse width control alternate output voltage $(a)_2$ having three levels of voltage E, O and —E.

Although the subtractors and the error signal amplifiers are separately provided in this embodiment circuit, this does not mean the DC level between the subtractor output and the error signal amplifier input is separated. This invention can be practiced even if a differential operational amplifier which integrates subtractors and amplifiers is used.

Although one pair of inverter equipments of single-phase output is used in the embodiments, this invention can be realized even if three pairs are used to form a three-phase inverter equipment.

Although a single-phase bridge inverter circuit is used as the conversion circuit of the inverter in FIG. 5 (Prior Art) this invention can be used with an ordinary half-bridge inverter circuit and a three-phase bridge inverter circuit.

Although this embodiment circuit is separately provided with a sine wave generator and an amplitude modulator, this invention can be realized by a sine wave generator which integrates the above components for amplitude adjustment.

Other embodiments and modification of the present invention will be apparent to those of ordinary skill in the art having the benefit of the teaching presented in the foregoing description and drawings. It is therefore, to be understood that this invention is not to be unduly limited and such modifications are intended to be included within the scope of the appended claims.

What is claimed is:

1. An inverter comprising:
    input means for receiving DC power from a DC power source;
    a converter circuit including plural semiconductor switch elements which are switch-controlled by control signals to convert DC power from said input means to a pulse-width modulated AC output,
    a filter which extracts a fundamental frequency from the pulse-width modulated AC output and provides the extracted fundamental as an inverter output; and
    a control circuit having an input for receiving the inverter output and generating said control signals for controlling the switch elements of said converter circuit, said control circuit including: (a) a DC reference voltage source, (b) converter means for rectifying said inverter output into a DC signal, (c) means, responsive to a difference between said DC signal voltage and said DC reference voltage, for generating a sine wave which is amplitude-modulated responsive to said difference, (d) means for generating a signal responsive to the difference between the amplitude-modulated (Am) sine wave and said inverter output voltage, and (e) means for pulse width modulating a carrier in response to the difference between said AM sine wave and said inverter output voltage; and
    logic means for generating said control signals in response to said pulse width modulated carrier.

2. An inverter comprising
    input means for receiving DC power from a DC power source;
    a converter circuit including plural semiconductor switch elements switch-controlled by control signals to convert DC power from said input means to a pulse with modulated AC output;
    a filter for filtering of said AC output;
    means for coupling a load to an output of said filter; and
    a control circuit having an input for receiving an output of said filter and generating control signals in response thereto said control circuit including:
    means for rectifying and smoothing the filtered AC output,
    a DC reference,
    first difference means for comparing the rectified and smoothed output of said filter with said DC reference and generating a first difference signal indicative thereof,
    means for generating a sine wave;
    means for modulating said sine wave based on said first difference signal,
    second difference means for comparing the modulated sine wave with the filtered AC output and generating a second difference signal indicative thereof,
    means for generating a carrier signal,
    means for modulating the carrier signal in response to second difference signal, and
    means for generating said control signals in response to said modulated carrier.

* * * * *